(12) United States Patent
Rings

(10) Patent No.: US 12,516,766 B2
(45) Date of Patent: Jan. 6, 2026

(54) DEVICE AND METHOD FOR SEALING OR REPAIRING A LEAKING AND/OR DAMAGED LOCATION ON AN INNER WALL OF A PIPE

(71) Applicant: VETTER GMBH, Zülpich (DE)

(72) Inventor: Christopher Rings, Düren (DE)

(73) Assignee: VETTER GMBH, Zülpich (DE)

( * ) Notice: Subject to any disclaimer, the term of this patent is extended or adjusted under 35 U.S.C. 154(b) by 400 days.

(21) Appl. No.: 17/908,694

(22) PCT Filed: Feb. 24, 2021

(86) PCT No.: PCT/EP2021/054567
§ 371 (c)(1),
(2) Date: Sep. 1, 2022

(87) PCT Pub. No.: WO2021/175674
PCT Pub. Date: Sep. 10, 2021

(65) Prior Publication Data
US 2023/0018322 A1    Jan. 19, 2023

(30) Foreign Application Priority Data
Mar. 6, 2020  (DE) .................... 10 2020 106 094.7

(51) Int. Cl.
*F16L 55/163*  (2006.01)
*B32B 1/08*  (2006.01)
(Continued)

(52) U.S. Cl.
CPC .............. *F16L 55/163* (2013.01); *B32B 1/08* (2013.01); *B32B 5/02* (2013.01); *B32B 25/10* (2013.01);
(Continued)

(58) Field of Classification Search
CPC ...... F16L 55/163; F16L 55/1645; F16L 55/18
(Continued)

(56) References Cited

U.S. PATENT DOCUMENTS 4,197,880 A * 4/1980 Cordia .................... B29C 61/04
                                                         138/178
5,049,003 A * 9/1991 Barton .................. F16L 55/163
                                                        405/184.2
(Continued)

FOREIGN PATENT DOCUMENTS

DE          4315417 C1    8/1994
DE          29807747 U1   7/1998
(Continued)

OTHER PUBLICATIONS

European Office Action for Application No. 21708192.6, dated Jan. 2, 2024, 5 pages, English translation.
(Continued)

*Primary Examiner* — David R Deal
(74) *Attorney, Agent, or Firm* — CANTOR COLBURN LLP

(57) ABSTRACT

A device and method for sealing or repairing a leaking and/or damaged location on an inner wall of a pipe, includes a volume-expandable bellow body configured to expand, with an increase in its volume, when the bellows body is positioned in the region of the leaking and/or damaged location in the interior of the pipe, with infiltration of a fluid, into a bellows-body interior. A carrier portion is formed on an outer surface of the bellows body, a resinated sealing mat being arrangeable on the carrier portion, the sealing mat being fastenable to the inner wall of the pipe, and being able to cure, in an expanded state of the bellows body in the region of the leaking and/or damaged location by being pressed against the inner wall.

(Continued)

The device can also be used reliably in long-term use, such that the carrier portion is formed from Para rubber or silicone.

7 Claims, 2 Drawing Sheets

(51) Int. Cl.
  *B32B 5/02* (2006.01)
  *B32B 25/10* (2006.01)
  *B32B 25/20* (2006.01)
  *F16L 55/1645* (2006.01)
  *B32B 7/09* (2019.01)
  *B32B 7/12* (2006.01)

(52) U.S. Cl.
  CPC .......... *B32B 25/20* (2013.01); *F16L 55/1645* (2013.01); *B32B 7/09* (2019.01); *B32B 7/12* (2013.01); *B32B 2255/26* (2013.01); *B32B 2260/021* (2013.01); *B32B 2260/046* (2013.01); *B32B 2262/101* (2013.01); *B32B 2307/3065* (2013.01); *B32B 2307/714* (2013.01); *B32B 2307/7246* (2013.01); *B32B 2581/00* (2013.01)

(58) Field of Classification Search
  USPC ..................................................... 138/98, 97
  See application file for complete search history.

(56) References Cited

U.S. PATENT DOCUMENTS

| | | | |
|---|---|---|---|
| 5,322,653 A * | 6/1994 | Muller | F16L 55/163 264/269 |
| 5,409,561 A * | 4/1995 | Wood | F16L 58/02 264/269 |
| 5,706,861 A * | 1/1998 | Wood | F16L 55/163 405/184.2 |
| 6,276,398 B1 * | 8/2001 | Lange | F16L 55/163 264/269 |
| 2016/0186911 A1 * | 6/2016 | Manners | F16L 55/1653 138/98 |

FOREIGN PATENT DOCUMENTS

| | | |
|---|---|---|
| DE | 102017127458 A1 | 5/2019 |
| EP | 0467077 A1 | 1/1992 |
| EP | 0625670 B1 | 10/1996 |
| WO | 2004023088 A1 | 3/2004 |

OTHER PUBLICATIONS

International Search Report issued May 6, 2021 re: Application No. PCT/EP2021/054567, pp. 1-2, citing: DE 29807747 U1, U.S. Pat. No. 20160186911 A1 and WO 2004023088 A1.

* cited by examiner

DEVICE AND METHOD FOR SEALING OR REPAIRING A LEAKING AND/OR DAMAGED LOCATION ON AN INNER WALL OF A PIPE

TECHNICAL FIELD

The present disclosure relates to a device for sealing or repairing a leaking and/or damaged location on an inner wall of a pipe, in particular of a wastewater pipe, comprising a volume-expandable bellow body which is configured to expand, with an increase in its volume, when the bellows body is positioned in the region of the leaking and/or damaged location in the interior of the pipe, with infiltration of a fluid, in particular a gaseous fluid, into a bellows-body interior, wherein a carrier portion is formed on an outer surface of the bellows body, a resinated sealing mat being arrangeable on said carrier portion, said sealing mat being fastenable to the inner wall of the pipe and being, able to cure in an expanded state of the bellows body in the region of the leaking and/or damaged location by being pressed against said inner wall of the pipe.

In this case, the device is not limited to a specific type of pipe or a specific field of application. A pipe is understood to be a hollow body through which a gaseous, liquid or viscous fluid or a solid-liquid mixture (e.g. wastewater) can be transported along a predetermined path. Pipes are used both in private households and in public utilities (for example, for drinking water supply or wastewater disposal). Pipes are also regularly used in industrial applications. Furthermore, the present disclosure is not limited to use with pipes of a particular material; rather, it can be used with pipes made of a wide variety of materials, such as metal, ceramic, or plastics.

BACKGROUND

The use of volume-expandable bellows bodies, for example rubber bellows, is well known in the field of pipe sealing or pipe repair. For example, rubber bellows are used with pipe sealing pads that can be inserted into a pipe and positioned at a predetermined location inside the pipe. After infiltration of a fluid into the interior of the rubber bellows, the pipe sealing pad expands and rests against an inner wall of the pipe, thereby closing or sealing the pipe. The contact pressure of the pipe sealing pad can be flexibly adjusted via the amount of infiltrated fluid. Possible fields of application of such a pipe sealing pad are the sealing of pipes during repair or maintenance work as well as the prevention of water backflow in the event of pipe bursts, floods, sewer inspections, sewer inspections, etc.

Depending on the profile of the pipe, it is known to use different shapes of pipe sealing pads or rubber bellows. In particular, cylindrical or conical pipe sealing pads are known.

For example, from EP 0 467 077 B1, an inflatable pipe sealing pad is known that can be inserted into a pipe at any location to seal it. The pad described there has conical end pieces and a circular-cylindrical center piece. Sealing in the case of different pipe diameters takes place linearly at the conical end pieces in the region of that diameter which corresponds to the inner diameter of the pipe. The cylindrical center piece, which generally forms folds, can also contribute to sealing if it is provided with a closed, circumferential sealing strip made of an elastic material, the sealing strip, when inflated, providing a seal between the cylindrical center piece and the inner wall of the pipe even in the region of the folds.

Furthermore, from DE 43 15 417 C1 and EP 0 625 670 B1, pipe sealing pads are known which are mounted stationary in a pipeline to perform the function of conventional gate valves in a simple manner. The inflatable pipe sealing pad is annular in shape and is mounted on the bracket, laid flat radially on the outside. When inflated, the pipe sealing pad bulges radially inwards to such an extent that the radial inner wall is pressed against itself on all sides so as to securely closing the pipeline. A pipe sealing pad of this type can only be used when mounted stationary.

For the repair of leaking and/or damaged locations of a pipe, it is also known to use so-called repair packers. In this case, an inflatable rubber bellows is placed on a repair packer that can be moved or displaced inside the pipe. Resin-impregnated repair mats can be arranged on the outer circumference of the rubber bellows, which repair mats, when the rubber bellows is inflated, can be pressed against the inner wall of the pipe where they cure. In addition, when the repair mat is pressed against the inner wall of the pipe, the resin can penetrate into cracks or open locations in the pipe. After removal of the repair packer (including the rubber bellows), the repair mat and the resin remain at the previously leaking and/or damaged location of the pipe. In the present description of the disclosure, the repair mats mentioned therein will be referred to synonymously as "sealing mats".

In the case of the known pipe sealing pad or repair packer applications, or the rubber bellows used therein, it has been shown that in the case of the arrangement of resin-impregnated sealing mats (repair mats), the conventionally used rubber material of the rubber bellows can be damaged by the influence of the resin, in particular in the case of long-term use. Resin residues also frequently remain on the rubber surface of the rubber bellows. In the worst case, the influence of the resin can lead to leakage of the pipe sealing pad.

SUMMARY

Accordingly, the present disclosure is based on the object of providing a device for sealing a leaking and/or damaged location on an inner pipe wall of a pipe which has increased robustness and resistance, in particular to resin, and can also be used reliably in long-term use.

To achieve this object, a device having the features of the independant device claim is proposed.

Furthermore, the present disclosure is based on the object of providing a reliable and resistant method for sealing a leaking and/or damaged location on an inner pipe wall of a pipe which is suitable for long-term use.

To achieve this object, a method having the features of the independant method claim is proposed.

Furthermore, the present disclosure is based on the object of enabling a use of a device configured according to the disclosure as a pipe sealing pad or as a pipe sealing pad arranged on a repair packer which is movable in a pipe, wherein the device in such a use has an increased robustness and resistance, in particular to resin, and a reliable use in long-term use is enabled.

To achieve this object, a use according to the claims is proposed.

It should be noted that the features listed individually in the claims can be combined with each other in any technically useful manner (even across category boundaries, for example between method and device) and indicate further embodiments of the disclosure. The description additionally characterizes and specifies the disclosure, in particular in connection with the figures.

It should also be noted that a conjunction "and/or" used herein which stands between two features and links them is always to be interpreted such that in a first embodiment of the subject matter according to the disclosure only the first feature may be present, in a second embodiment only the second feature may be present, and in a third embodiment both the first and second features may be present.

The present disclosure relates to a device for sealing or repairing a leaking and/or damaged location on an inner wall of a pipe, in particular of a wastewater pipe, comprising a volume-expandable bellow body which is configured to expand, with an increase in its volume, when the bellows body is positioned in the region of the leaking and/or damaged location in the interior of the pipe, with infiltration of a fluid, in particular a gaseous fluid, into a bellows-body interior, wherein a carrier portion is formed on an outer surface of the bellows body, a resinated sealing mat being arrangeable on said carrier portion, said sealing mat being fastenable to the inner wall of the pipe and being able to cure in an expanded state of the bellows body in the region of the leaking and/or damaged location by being pressed against said inner wall of the pipe.

In the context of the present disclosure, a "sealing" can be understood to mean, in particular, a local sealing of a leaking and/or damaged location on an inner wall of a pipe. Here, such a local sealing can be done by sealing the leaking and/or damaged location with a sealing mat which, prior to attaching it to the leaking and/or damaged location, is provided with a resin (e.g., impregnated therewith). After pressing the sealing mat against the inner wall of the pipe in the region of the damaged and/or leaking location, the resin cures. In the process of this, the resin can also penetrate at least partially into the leaking and/or damaged structure and fill it. At the same time, the curing resin causes the sealing mat to be fastened to the inner wall of the pipe. The sealing mat—which, for example, can be formed from a glass fiber fabric (but also other types of fabric)—additionally structurally reinforces the inner wall of the pipe in the region of the leaking and/or damaged location. Provided that the damaged location does not have any leakage defects, this can also be referred to as a repair or restoration of such a location.

At the same time, "sealing" can be understood to mean closing off a pipe with the above-mentioned device. This is because volume expansion of the bellows body can cause it to rest against the inner wall of the pipe in such a manner that the pipe is completely closed. In this case, too, the pipe or indirectly also leaking and/or damaged locations are "sealed". Furthermore, the above-mentioned device can be used to close a pipe in an undamaged region and/or a region not affected by sealing defects, so that a repair or other sealing can be carried out in the region of the leaking and/or damaged location(s). Thus, even in this case, the above-mentioned device contributes to "sealing" damaged and/or leaking locations of a pipe.

The device proposed by the disclosure can be used as a pipe sealing pad or repair packer, or in connection with a repair packer (or a push hose). A use as a bypass pad is also conceivable. Furthermore, it is possible that the pipe sealing pad is provided with a lead-through (e.g. when used as a test pad). In principle, the bellows body can be manufactured in any shape, in particular to match the shape of the pipe in which the above-mentioned device is to be used. The bellows body can be circular, elliptical, oval, egg-shaped or otherwise in cross-section.

In the context of the present disclosure, a "leaking location" means that location on an inner wall of a pipe through which either foreign matter can penetrate the pipe or a pipe content can escape from the pipe. While a "damaged location" can also be leaking at the same time, this need not necessarily be the case. For example, damage that is in the early stages, such as a longitudinal or transverse crack (or porous location) in the inner wall of the pipe, does not necessarily cause the pipe to leak. However, in order to counteract such leakage as a possible late effect of damage at an early stage, a sealing, for example using the device proposed by the disclosure, is helpful. The present disclosure is therefore also readily suitable for damage prevention.

In the context of the present disclosure, a volume-expandable bellows body is to be understood as a body whose volume can undergo volume expansion, thus expands, due to suitable fluid infiltration. The volume expansion can be isotropic or anisotropic (e.g. along a preferred direction); when a cylindrical (circular in cross-section) bellows body is positioned in a pipe, this expansion occurs primarily in the radial direction, i.e. in the direction of the inner wall of the pipe. Expansion can also take place in all spatial directions, for example in the radial direction when a cylindrical bellows body is positioned in a tube, and possibly also in the longitudinal direction of the cylindrical bellows body. Depending on the shape of the bellows body, isotropic (uniform) expansion can also take place in all spatial directions (e.g. in the case of a spherical bellows body), at least until the bellows body abuts against the inner wall of the pipe in a spatial direction. The expansion can thus be delimited by the pipe, in particular the inner wall of the pipe. To allow sufficient expansion, the bellows body is formed of an expandable or elastic material.

The bellows body is configured to be tight and resistant to external media (for example water), and at the same time to be mechanically robust or abrasion-resistant to solid bodies, for example the inner wall of the pipe. The latter is of particular relevance when inserting the device or the bellows body into the pipe, as this inevitably causes friction on the inner wall of the pipe.

The fluid mentioned can be a gaseous or liquid fluid. Considered as gaseous fluids can be in particular air, $CO_2$ or $N_2$. Liquid fluids can be, in particular, water or oils. The fluid can be infiltrated or introduced into the bellows body via a suitable inlet valve, for example under pressure (e.g. by means of a suitable pumping device). The same applies to the discharge of the fluid which can be removed from the bellows body via a suitable discharge valve. In principle, it is also possible to heat the infiltrated fluid to a predetermined temperature and only then allow it to enter the bellows body interior (which provides a cavity or suitable cavity chambers). Thus, the curing of the resin can be improved or the curing of a thermosetting resin can be made possible. However, it should be emphasized at this point that the disclosure also makes it readily possible to attach sealing mats impregnated with a cold-curing resin, and likewise also to cure the resin at room temperature or at a temperature prevailing in the pipe to be sealed or repaired. Also, additional heating means or irradiation means can be provided on the device which effect curing of the resin.

As mentioned, a carrier portion is formed on an outer surface of the bellows body, on which carrier portion a resinated sealing mat can be arranged. The carrier portion can be formed in a partial region of the outer surface, and, at the same time, a plurality of carrier portions (spaced apart from each other) can be formed on the outer surface of the bellows body. Alternatively, the entire surface of the bellows body can act as a carrier portion and be formed as one. The latter is advantageous as it allows free arrangement of a sealing mat on any location of the outer surface of the bellows body. The formation of a suitable carrier portion is advantageous since the bellows body can thus be removed relatively easily after the resinated sealing pad has been fastened to the inner wall of the pipe; the carrier portion thus has the effect of facilitating separation of the bellows body from the sealing pad, for example in the manner of a release agent. It is advantageous if the carrier portion has anti-adhesion properties with respect to the resin used. At the same time, the carrier portion must also meet the desired requirements for tightness, material robustness, abrasion resistance and ductility.

In order to meet these requirements, the device is characterized according to the disclosure in that the carrier portion is formed from Para rubber or silicone.

Surprisingly, it has been found that Para rubber has a particular resistance to resin. As mentioned, a resinated (provided with resin or impregnated with resin) sealing mat can be arranged on the device proposed by the disclosure, in particular on the bellows body or a carrier portion provided therein. In this process, the resin inevitably also comes into contact with the outer surface of the bellows body. Accordingly, it is of decisive importance that the outer surface has sufficient resistance to the resin and, furthermore, that sufficient separability of the outer surface from the resin-impregnated sealing mat is enabled (separation effect). These requirements are met in particular by Para rubber as the material of the carrier portion. Thus, the use of Para rubber enables durable and repeated use of the device proposed by the disclosure for sealing and/or repair purposes with improved resin resistance of the outer surface of the bellows body. Accordingly, the longevity of such a device is increased. Para rubber exhibits exceptionally high elasticity, a critical property for ensuring adequate volume expansion of the bellows body. Para rubber is a slightly vulcanized rubber that is easy to process and apply to the bellows body. An alternative to the use of natural Para rubber is silicone, with which similar advantages can be achieved.

The carrier portion formed from Para rubber or silicone—when arranging a resinated sealing pad on the carrier portion—results in the bellows body being relatively easy to remove after the resinated sealing pad has been fastened to the inner wall of the pipe; the material of the carrier portion thus facilitates easy separation from the sealing pad, for example in the manner of a release agent. Para rubber and silicone thus exhibit anti-adhesion properties with respect to the resin.

As already mentioned above, the carrier portion can be formed of Para rubber or silicone. The carrier portion can be formed in a partial region of the outer surface of the bellows body. However, it is readily also possible that the entire outer surface of the bellows body provides a carrier portion, i.e., is formed from Para rubber or silicone. By the term used herein, according to which the carrier portion is "formed" from Para rubber or silicone, it is to be understood in the meaning of the present disclosure that the material forming the bellows body (e.g. an outer material layer of the bellows body) as such provides the carrier portion. Furthermore, "formed" can be understood to mean that the outer surface of the bellows body has a "coating" of Para rubber or silicone which then forms the carrier portion. The coating can be applied to the outer surface of the bellows body partially or over the entire surface. Thus, in the context of the present disclosure, a "coating" is understood to mean the application of one or more layers of Para rubber or silicone onto the outer surface of the bellows body (e.g., an outer layer of material) so as to form a carrier portion.

In the following, the advantageous embodiments indicated in the subclaims as well as further advantageous (or possible) embodiments of the device proposed by the disclosure are described in detail.

According to a first embodiment of a device proposed by the disclosure, it can be provided that the bellows body is made of a multilayer material, wherein the outer surface of the bellows body is formed by an outer material layer of the multilayer material. In this case, the outer material layer can be at least partially formed from para rubber or silicone and form the carrier portion. Furthermore, it is possible that the outer material layer comprises a Para rubber coating or silicone coating forming the carrier portion and at least partially covering the outer surface of the bellows body.

By the indication that the outer material layer of the bellows body is at least partially formed of para rubber or silicone, it is to be understood that at least one portion or region of the outer material layer is formed entirely of Para rubber or silicone. Several portions—arranged spaced apart from one another—formed from para rubber or silicone can also be provided. However, adjacent portions can be formed from other materials. Alternatively, the outer material layer can also be made up of several partial layers, of which only the outer partial layer is formed at least partially (i.e. region-wise or area-wise) from Para rubber or silicone; this variant is also comprised by the indication of an at least partial formation of the bellows body from Para rubber or silicone. A "formation" of Para rubber or silicone is to be distinguished from a coating with Para rubber or silicone (variant of para rubber coating or silicone coating).

By the formation of the bellows body from a multi-layer material is to be understood that several layers (but at least two layers) of the same or different materials are connected to each other in a firmly bonding or form-fitting manner and form a bellows body wall. In this case, the bellows body does not have to be formed in one piece; rather, it can have a plurality of parts connected to each other, e.g. in the case of a cylindrical geometry of the bellows body, for example, a jacket part that is connected to end-face end parts. The aforementioned parts can each be formed from a plurality of layers of the same or different materials.

In the case of other geometries of bellows bodies it is also known to manufacture them from a plurality of parts and to connect them to one another. The possibility of manufacturing a bellows body composed of a plurality of parts (each comprising one or more layers of material) is well known in the manufacture of pipe sealing pads or bellows bodies for repair packers. The connection of individual parts of a bellows body (e.g., a jacket part with end parts) can be provided by sewing, knitting, welding, gluing, riveting, screwing, etc. Layers of material can also be connected to one another by the aforementioned types of connection. However, other methods can be used to connect the layers of material to one another, such as thermoforming, thermal joining, hot welding, or other methods.

If the bellows body is manufactured from a plurality of layers, the outer layer can be provided to seal the bellows body inwardly, thus, to prevent liquids, gases or solids from penetrating into the interior of the bellows body, but also to prevent the content of the bellows body (e.g. fluids) from escaping outwardly. Inner layers can then perform a supporting function to give the bellows body sufficient mechanical stability. However, this does not preclude that inner layers of material also contribute to the sealing of the bellows body.

According to another advantageous embodiment of a device proposed by the disclosure, it can be provided that the bellows body is made of a single material layer, wherein the outer surface of the bellows body is formed by the single material layer. This (single) material layer can be at least partially formed from Para rubber or silicone and form the carrier portion. Furthermore, the material layer can additionally or alternatively comprise a Para rubber coating or silicone coating forming the carrier portion and at least partially covering the outer surface of the bellows body.

Regardless of whether the bellows body is constructed from one material layer or a plurality of material layers, it is necessary that at least in those regions of the bellows body in which, in functional use, a resinated sealing mat is to be arranged, the outer material layer is coated with Para rubber or silicone or is formed from Para rubber or silicone.

In order to form the Para rubber coating, it can be provided to vulcanize it onto the bellows body. By means of such an application (vulcanization), a mechanically stable and durable attachment of the Para rubber coating can be ensured. Vulcanization is generally understood to mean a method in which natural rubber is converted into elastomeric rubber. In the present case, the Para rubber coating can be applied, for example, by means of conventional sulfur vulcanization, vulcanization with peroxides, metal oxides or in a radiation-induced manner.

According to another embodiment of a device proposed by the disclosure, it can be provided that the sealing mat comprises a glass fiber fabric as a carrier material for a resin. A glass fiber fabric is an important construction material that, for example, can improve the mechanical properties of composite components (in particular glass fiber-plastic composite components). At the same time, however, glass fiber fabric is also excellently suited as a support and/or carrier material that can be used to structurally reinforce damaged material surfaces (e.g. a pipe). Such a glass fiber fabric can be placed flat and flush against a surface and fastened thereto. Fiberglass fabric is also characterized by the fact that it is particularly resistant to aging and weathering (moisture resistant), chemically inert and non-flammable. Ultimately, fiberglass fabric has excellent properties for use in pipes, in particular wastewater pipes. Furthermore, fiberglass fabric has a relatively high modulus of elasticity, which is also beneficial for use on a volume-expandable bellows body as well as for the arrangement on curved surfaces such as inner pipe walls. Furthermore, glass fiber fabric is a suitable carrier for a resin, which—as described at the beginning—is used to fasten the glass fiber fabric to the inner pipe wall and also seals the damaged and/or leaking location together with the sealing mat (the glass fiber fabric). The resin used can—but need not—be a multi-component resin, for example.

According to another embodiment of a device proposed by the disclosure, it can be provided that the bellows body comprises one or more valves for introducing and discharging the fluid. In use, the valves can be connected to lines, hoses, etc. to fill and expand the bellows body on the spot (i.e., within the pipe) with the fluid. It must also be ensured in the vicinity of the valves that the bellows body is leak-proof to the outside, i.e. that any penetration of external substances into the bellows body or any unintentional escape of fluid is prevented.

As mentioned at the beginning, the object underlying the disclosure is also achieved with a method for sealing or repairing a leaking and/or damaged location on an inner wall of a pipe. The pipe—as mentioned—can be a wastewater pipe. According to the method, the following steps are provided:

a. providing a volume-expandable bellows body, wherein a carrier portion for a resinated sealing mat is formed on an outer surface of the bellows body;
b. arranging a resinated sealing mat on the carrier portion;
c. positioning the bellows body in the interior of the pipe in the region of the leaking and/or damaged location;
d. infiltrating a fluid, in particular a gaseous fluid, into a bellows body interior, wherein the bellows body expands as a result of the fluid infiltration while increasing its volume;
e. fastening the resinated sealing mat to the inner pipe wall by:
   i. pressing the resinated sealing mat against the leaking and/or damaged location on the inner pipe wall of the pipe as a result of the expansion of the volume of the bellows body, and
   ii. curing the resinated sealing mat;
f. removing the bellows body from the pipe.

The "provision" of the bellows body as mentioned in method step a can be understood in the meaning of the method to mean both a manufacture of the bellows body and any other provision (for example, a purchase or simple delivery, unpacking or preparation) of the bellows body. As mentioned, a resin-coated sealing mat is understood to mean a sealing mat provided with, treated with, or impregnated with a resin. According to the method step b., the sealing mat is arranged, thus positioned, on the carrier portion. It is also possible to arrange multiple sealing mats on one or more carrier portions of the bellows body. The arrangement can be done manually or by machine.

As mentioned in step c., the bellows body is positioned in the interior of the pipe in the region of the leaking and/or damaged location. The leaking and/or damaged location can have been previously detected and located using a suitable exploration method, such as a camera-based method. Based on the localization, the bellows body (in a non-expanded state) can then be positioned at the corresponding location of the pipe interior, for example using a positioning means. A positioning means can be, for example, a transport carriage, a rolling or pushing device. Also, rollers or wheels may be arranged on the bellows body so that the bellows body can be positioned inside the pipe by means of a push hose.

After positioning, a fluid (e.g. air) is infiltrated or introduced into the bellows body interior (via a suitable supply line and valves). In the process of this, the bellows body expands in the direction of the inner pipe wall. As a result, the resin-coated sealing mat is pressed against the leaking and/or damaged location on the inner wall of the pipe. During this process of this or subsequently, the resinated sealing mat is allowed to cure. Finally, the bellows body is removed from the pipe.

A device configured according to the disclosure can be used as a pipe sealing pad or as a pipe sealing pad arranged on a repair packer that is movable in a pipe.

BRIEF DESCRIPTION OF THE DRAWINGS

Further features and advantages of the disclosure result from the following description of an exemplary embodiment of the disclosure which is not intended to be restrictive and which is explained in more detail below with reference to the drawing. In this drawing, schematically.

DETAILED DESCRIPTION OF THE DRAWINGS

Figure 1:
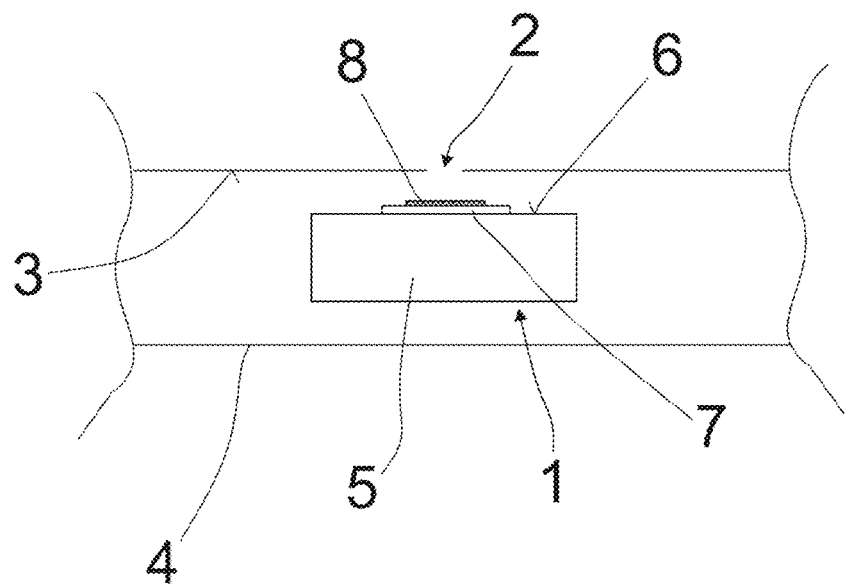
FIG. 1 shows a bellows body positioned inside a pipe in the region of a leaking and/or damaged location as a component of a device according to the disclosure, the bellows body being shown in a non-volume-expanded state.

FIG. 1 schematically illustrates a device 1 according to the disclosure for sealing or repairing a leaking and/or damaged location 2 on an inner pipe wall 3 of a pipe 4. The pipe 4 can be, for example, a wastewater pipe having a crack as an example of a leaking and/or damaged location 2, wherein such a crack can result in a leaking pipe 4.

The illustrated device 1 comprises a volume-expandable bellows body 5 positioned in the region of the leaking and/or damaged location 2 of the pipe 4. A carrier portion 7, on which a resinated sealing mat 8 is arranged, is formed on an outer surface 6 of the bellows body 5. In the present example, the carrier portion 7 is configured in the form of a partial coating of the outer surface 6 of the bellows body 5. The resinated sealing mat 8 is provided or impregnated with resin before being arranged on the carrier portion 7.

Figure 2:
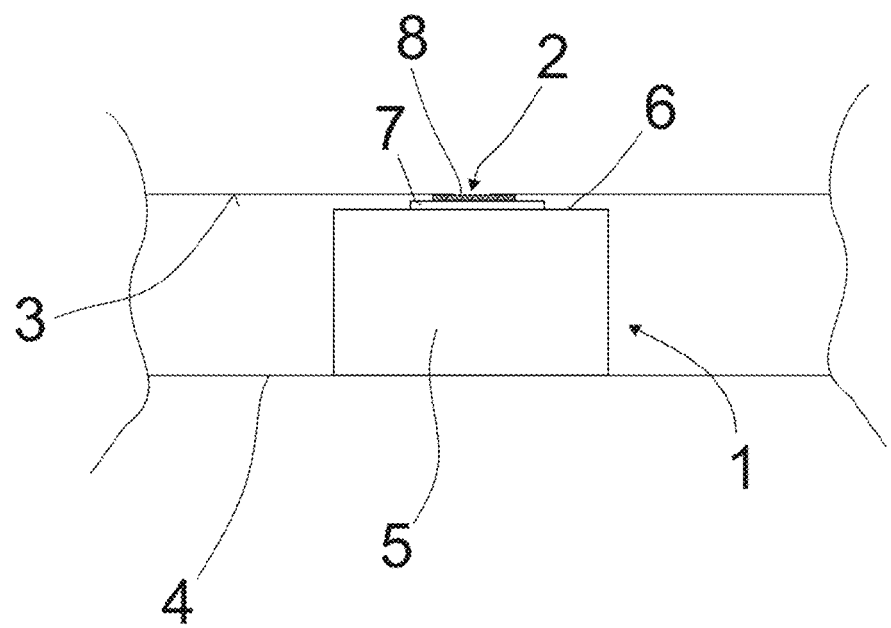
FIG. 2 shows the device according to FIG. 1, wherein the bellows body is shown in a volume-expanded state.

After the bellows body 5 is positioned in the region of the leaking and/or damaged location 2, a bellows body interior is infiltrated (e.g., inflated) with a fluid, such as air. In the process of this, the bellows body 5 expands by increasing its volume. In an expanded state of the bellows body 5—cf. FIG. 2—the resinated sealing mat 8 is pressed against the inner pipe wall 3 of the pipe 4 in the region of the leaking and/or damaged location 2. As a result, the resin-coated sealing mat 8 cures and remains at the leaking and/or damaged location 2 of the pipe 4 after the bellows body 5 has been removed. Prior to removing the bellows body 5, the fluid (e.g. air) is discharged via a valve and the volume of the bellows body 5 decreases. Thereafter, the bellows body 5 or the device 1 can be removed from the pipe in a simple manner. As explained at the beginning, according to the disclosure, the carrier portion 7 is formed from Para rubber or silicone.

Figure 3:
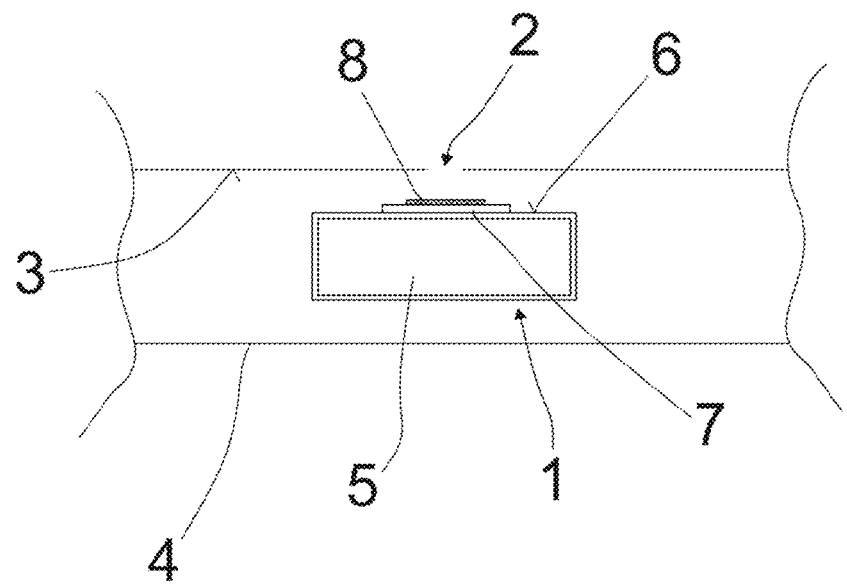
FIG. 3 shows the device 1 wherein the outer material layer has a Para rubber coating which forms the carrier portion 7 and which at least partially covers the outer surface 6 of the bellows body 5.
Figure 4:
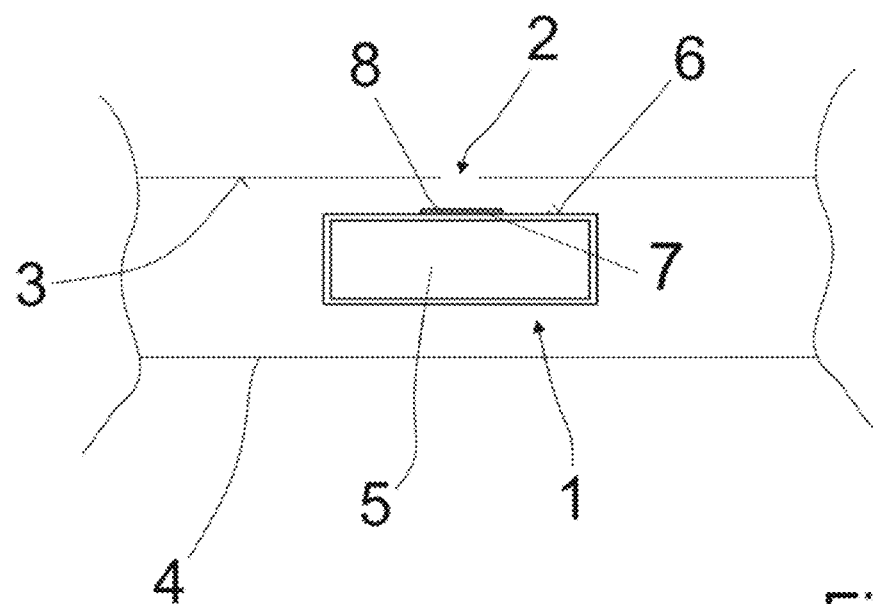
FIG. 4 shows the device 1 wherein the outer material layer is at least partially formed from Para rubber and forms the carrier portion 7.

FIGS. 3 and 4 show the device 1 wherein the bellows body 5 is made of a multilayer material and wherein the outer surface 6 of the bellows body 5 is formed by an outer material layer of the multilayer material.

The invention claimed is:

1. A device for sealing or repairing a leaking and/or damaged location on an inner pipe wall of a pipe, the device comprising: a volume-expandable bellow body configured to expand, with an increase in its volume, when the bellows body is positioned in the region of the leaking and/or damaged location in the interior of the pipe, with infiltration of a fluid, into a bellows-body interior, wherein a carrier portion is formed on an outer surface of the bellows body, a resinated sealing mat being arrangeable on said carrier portion, said sealing mat being fastenable to the inner wall of the pipe and being able to cure in an expanded state of the bellows body in the region of the leaking and/or damaged location by being pressed against said inner wall, wherein the carrier portion is formed from Para rubber, wherein the bellows body is made of a multilayer material, wherein the outer surface of the bellows body is formed by an outer material layer of the multilayer material, wherein multiple layers of the same or different materials are connected to each other in a firmly bonding or form-fitting manner and form a bellows body wall, and either the outer material layer is at least partially formed from Para rubber or silicone and forms the carrier portion, or the outer material layer has a Para rubber coating or silicone coating which forms the carrier portion and which at least partially covers the outer surface of the bellows body, or wherein the bellows body is made of a single material layer, wherein the outer surface of the bellows body is formed by the single material layer, and the material layer has a Para rubber coating or silicone coating which forms the carrier portion and which at least partially covers the outer surface of the bellows body.

2. The device according to claim 1, wherein the material layer is at least partially formed from Para rubber or silicone and forms the carrier portion.

3. The device according to a claim 1, wherein the sealing mat comprises a glass fiber fabric as a carrier material for a resin.

4. The device according to claim 3, wherein the resin is a multi-component resin.

5. The device according to claim 1, wherein the bellows body has one or more valves for introducing and discharging the fluid.

6. A method for sealing or repairing a leaking and/or damaged location on an inner pipe wall of a pipe, the method including the following steps:

a. providing a volume-expandable bellows body, wherein the bellows body is made of a multilayer material, wherein the outer surface of the bellows body is formed by an outer material layer of the multilayer material, wherein multiple layers of the same or different materials are connected to each other in a firmly bonding or form-fitting manner and form a bellows body wall, and either the outer material layer is at least partially formed from Para rubber or silicone and forms the carrier portion, or the outer material layer has a Para rubber coating or silicone coating which forms the carrier portion and which at least partially covers the outer surface of the bellows body, or wherein the bellows body is made of a single material layer, wherein the outer surface of the bellows body is formed by the single material layer, and the material layer has a Para rubber coating or silicone coating which forms the carrier portion and which at least partially covers the outer surface of the bellows body, wherein a carrier portion for a resinated sealing mat is formed on an outer surface of the bellows body;

b. arranging a resinated sealing mat on the carrier portion;

c. positioning the bellows body in the interior of the pipe in the region of the leaking and/or damaged location;

d. infiltrating a fluid, into a bellows body interior, wherein the bellows body expands as a result of the fluid infiltration while increasing its volume;

e. fastening the resinated sealing mat to the inner pipe wall by:

i. pressing the resinated sealing mat against the leaking and/or damaged location on the inner pipe wall of the pipe as a result of the expansion of the volume of the bellows body, and
   ii. curing the resinated sealing mat; and
 f. removing the bellows body from the pipe.

7. A use of a device configured according to claim 1 as a pipe sealing pad or as a pipe sealing pad arranged on a repair packer that is movable in a pipe.

* * * * *